Patented Dec. 20, 1932

1,891,829

UNITED STATES PATENT OFFICE

ALEXANDER NATHANSOHN, OF BERLIN-WILMERSDORF, GERMANY

PROCESS OF HIGHLY POLYMERIZING CELLULOSE ACETATE AND THE PRODUCT THEREOF

No Drawing. Application filed October 3, 1929, Serial No. 397,165, and in Germany October 16, 1928.

My invention relates to the polymerization of cellulose acetate. It is well known that in the making of those compounds a partial decomposition of the cellulose molecule takes place, which impairs the mechanical strength of the products. In the case of acetylcellulose, that decomposition is especially marked. The poor tensile strength of artificial silk made from acetyl cellulose, and the difficulties of gelatinizing its solutions in the manufacture of celluloid-like products, are due to that partial destruction or diminution of the cellulose molecule. My invention serves to counteract those adverse effects by a polymerizing process.

According to my invention the cellulose ester is dissolved in a suitable solvent and a phosphorus-halogen compound is added to the solution. A heavy polymerization of the cellulose compound takes place. The products yield solutions of a viscosity greatly in excess of the corresponding solutions of the original compounds, and more apt to gelatinize even in a dilute state. I have found it is useful to add, to the reacting mixture, certain amounts of organic bases, as pyridine, quinoline, aniline and the like.

As an example, I shall describe the treatment of an acetyl cellulose, which, in its original state, gives with 10 times its weight of acetone a solution of the viscosity 10, measured in absolute units and at ordinary room temperature. 10 kilograms of that material were dissolved in 200 kilograms of acetone, and 300 grams of phosphorus oxychloride and one kilogram of pyridine were added. The mixture was stirred, at ordinary temperature, during two hours. Then the product was precipitated by adding water to the solution. It is soluble in acetone, and a ten percent solution coagulates into a gelatinous mass, which is especially suited for the manufacture of celluloid-like products.

If the same original material is treated with one hundred grams of phosphorus oxychloride and 350 grams of pyridine, the product assumes a viscosity which makes it excellently suited for the manufacture of artificial silk.

The process can be modified in many ways, without departing from the principle of the invention. For instance, phosphorus trichloride, or sulfochloride, or pentachloride, may be substituted for phosphorus oxychloride. Even organic phosphorus compounds may be used, for instance chlorophosphines (phenyl-chloro-phosphine, di-ethyl-amino-chloro-phosphine and analogous compounds) or compounds derived from chloro-phosphines by the introduction of either oxygen or sulfur or additional halogen into the molecule; or organic phosphorus-halogen-compounds, in which the organic radical is fixed in an ester-like combination, as for instance phenyl-phosphoryl-di-chloride

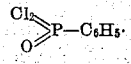

In other words: any compound containing both phosphorus and a halogen, may serve to carry out the invention.

The amount of the phosphorus compound applied depends on the degree of decomposition, which the original material has undergone, and on the viscosity desired. I do not wish to be restricted to the exact quantities given in the examples above, but to vary them upward and downward according to the effect desired in each case. By the addition of much phosphorus compound, products insoluble in acetone are obtained.

If organic bases are added, their amount must not necessarily be equivalent to the amount of the phosphorus compound. Even smaller additions may have a very marked effect.

The solvent should be of a nature not to destroy phosphorus oxychloride. Acetone, or chloroform, or ethers are suitable solvents, among which the most convenient for the cellulose compound treated in each case may be picked. Any reaction, which occurs between phosphorus oxychloride and the solvent, must be compensated by adding an excess of the former. It is not necessary to effect a complete solution of the cellulose compound, as the process may be carried out with even less solvent than for such complete solution.

The precipitation of the product by water and its separation from the solution, which is mentioned in the example given above, is not a necessary step of the process. In some cases the reactive mixture itself, filtered or not, with or without the application of additional reagents, may be used in succeeding operations.

I am aware that acetyl cellulose has been made by dissolving cellulose in a mixture of glacial acetic acid and acetic anhydride and adding phosphorus oxychloride to the solution. In that case, the primary reaction is between the phosphorus oxychloride and the solvent, and the process is, in principle, an acetylation by means of the acetyl chloride formed by the primary reaction. (Cf. Hess, Cellulose-Chemie, vol. p. 389). No polymerization is observed in that process. For my process, the original mixture of esterification, or the mixture of saponification applied for the preparation of a secondary acetate, are very unsuitable media. A very great and impracticable amount of phosphorus compounds would be required to carry out the desired reaction. It is substantial, in my process, to apply phosphorus compounds to cellulose derivatives separated from the mixture of solvents and reagents in which they are made and which are transferred into another solvent.

I claim:

1. A process of manufacturing highly polymerized cellulose acetates which comprises treating cellulose acetate with an organic solvent which is substantially inert with respect to a halogen-phosphorus compound, and adding to the product a quantity of the halogen-phosphorus compound.

2. A process as in claim 1 in which the halogen-phosphorus compound contains an organic radical.

3. A process as in claim 1 in which the halogen-phosphorus compound is a chloro-phosphine.

4. A process as in claim 1 in which the halogen-phosphorus compound is a compound of a chloro-phosphine.

5. A process as in claim 1 in which the halogen-phosphorus compound is a chloro-phosphine containing an aromatic radical.

6. A process of manufacturing highly polymerized cellulose acetates which comprises treating the cellulose acetate with an organic solvent which is substantially inert with respect to a halogen-phosphorus compound, admixing an organic base, and adding to the product a quantity of the halogen-phosphorus compound.

7. A process of manufacturing highly polymerized cellulose acetates which comprises treating cellulose acetate with an organic solvent which is substantially inert with respect to a halogen-phosphorus compound, and adding to the product so small a quantity of the halogen-phosphorus compound that the product obtained is completely soluble in pure acetone through containing an amount of phosphorus which may be detected analytically.

8. A highly polymerized cellulose acetate made according to the process of claim 1 and being completely soluble in pure acetone, containing phosphorus, and producing solid masses of high tensile strength.

In testimony whereof I have signed my name to this specification.

ALEXANDER NATHANSOHN.